United States Patent Office 3,713,995
Patented Jan. 30, 1973

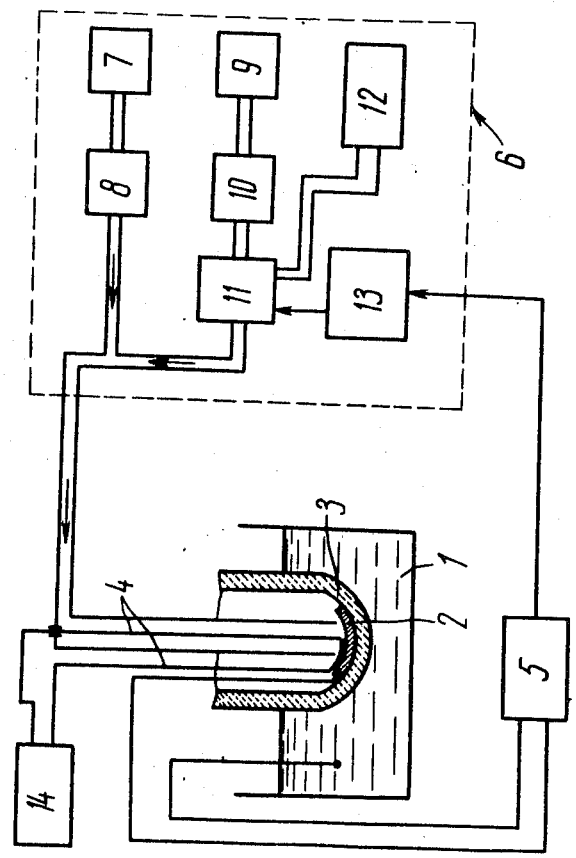

3,713,995
METHOD FOR DETERMINING ACTIVITY OF OXYGEN IN LIQUID AND SOLID METALS AND ALLOYS
Petr Alexeevich Cherkasov, Balashikhinskogo raiona 3, liniya 45, Poselok Nikolskoe Moskovskoi Oblasti, U.S.S.R.; and Evgeny Mikhailovich Kuznetsov, Lomonosovsky prospekt 14, kv. 340; Vyacheslav Vasilievich Averin, ulitsa Vavilova 44, korpus 4, kv. 214; and Alexandr Mikhailovich Samarin, Leninsky prospekt 13, kv. 48, all of Moscow, U.S.S.R.
Filed Dec. 12, 1969, Ser. No. 884,582
Int. Cl. G01n 27/46
U.S. Cl. 204—1 T                    3 Claims

ABSTRACT OF THE DISCLOSURE

An apparatus for determining the activity of oxygen in a liquid and solid metal and alloys which includes a control for the partial pressure of oxygen in a reference electrode, which latter electrode is one of a pair of electrodes of an oxygen concentration cell. When the electromotive force across the pair of electrodes of the cell varies from a zero value, the control adjusts the partial pressure of oxygen in the reference electrode to a value corresponding to the oxygen activity of the metal or alloy being tested, this metal or alloy forming the other of the pair of electrodes of the oxygen concentration cell.

---

The present invention relates to methods and apparatus for determining the content of gases in metals and alloys, and, more particularly, it relates to methods and apparatus for determining the activity of oxygen in metals and metal alloys.

There are known apparatus for determining the activity of oxygen in liquid and solid metals and alloys, such apparatus comprising an oxygen concentration cell with a pair of electrodes, one of these electrodes being formed by a metal or alloy being tested, whereas the other electrode, which serves as a reference electrode, is formed by a metal or alloy having a predetermined constant activity of oxygen, the apparatus further comprising an instrument for measuring the electromotive force across the two electrodes of the concentration cell.

In these known apparatus, the activity of oxygen in the reference electrode is maintained at a constant level by directing a stream of air over the reference electrode, which practice is apt to bring about a considerable difference between the oxygen activity of the metal being tested and that of the reference electrode.

Moreover, when the oxygen activity in the reference electrode is maintained at a constant level, the known apparatus can have as the solid electrolyte thereof only materials featuring an entirely ionic conductivity. These known apparatus use zirconium dioxide stabilized with calcium oxide ($ZrO_2$+CaO) for their solid electrolyte. Should material having a mixed conductivity (ionic plus electronic) be used in these known apparatus, it might lead to a considerable measurement error, since the proportion of the ionic conductivity of the electrolyte can hardly be determined with a sufficient accuracy in the course of measurement.

A considerable difference between the oxygen activity in the metal being tested and that in the reference electrode, which the known apparatus, as it has been already explained, are apt to feature, leads to the electromotive force (E.M.F.) across the electrodes of the cell being as high as 800 to 1000 mv., and even higher. In this case a one percent error in measuring the E.M.F. signifies an error in determining the oxygen activity at 1600° C. as great at 10 to 15 percent. When the E.M.F. measurement error is about 5 percent, the oxygen activity determination error might be as great as 50 to 85 percent.

Besides, the electrolyte used in the known apparatus (i.e. the $ZrO_2$+CaO composition) is characterized by an inadequate high-temperature stability.

It is, therefore, an object of the present invention to provide an apparatus and method for determining the activity of oxygen in liquid and solid metals and alloys, which is adapted to use an electrolyte featuring mixed or dual conductivity.

With this and other objects in view, the present invention resides in an apparatus for determining oxygen activity in liquid and solid metals and alloys, comprising an oxygen concentration cell having a pair of electrodes, one of said pair of electrodes including the metal being tested, the other one of said electrodes serving as the reference electrode and including a metal or an alloy having a predetermined and known oxygen activity; means for measuring the electromotive force produced by said oxygen concentration cell, in which apparatus, in accordance with the present invention, there are further provided means for controlling the partial pressure of oxygen in said reference electrode, operatively connected with said electromotive force measuring means, said means for controlling the partial pressure of oxygen in said reference electrode being actuated by the value of said electromotive force deviating from zero; said last-mentioned means when actuated, being adapted to adjust the partial pressure of oxygen in said reference electrode to a value corresponding to the oxygen activity of said metal being tested; and means for using said last-mentioned value for the determination of the oxygen activity in said metal being tested.

An apparatus, constructed in accordance with the present invention, insures accurate determination of the oxygen activity of liquid and solid metals and metal alloys.

With an apparatus, constructed in accordance with the present invention, being adapted to use various types of electrolytes and featuring mixed conductivity (both ionic and electronic), it becomes possible to choose the electrolyte from materials having an adequately high thermal stability and being sufficiently resistant to the action of the metal being tested and of the slags.

The present invention will be better understood from the following detailed description of an embodiment thereof, with due reference being made to the accompanying drawing in which the sole figure shows a block diagram of an apparatus, constructed in accordance with the present invention.

The illustrated apparatus comprises an oxygen concentration cell of which the first electrode is constituted by a liquid metal or alloy 1 being tested (a solid metal or alloy can be handled by this apparatus, too), whereas the other electrode 2, which is the reference electrode, is made of a metal or an alloy with a predetermined oxygen activity. The electrodes 1 and 2 are separated by a solid electrolyte 3 which is formed of a refractory material based on aluminum oxide. The reference electrode 2 has attached thereto the "hot" junction of a thermocouple 4 which is used for measuring the temperature of the metal 1 being tested. The two electrodes of the cell are electrically connected with an electromotive force measuring device 5. The E.M.F. measuring device 5, in its turn, is connected with oxygen 6 partial pressure controller means for controlling the partial pressure of oxygen in the reference electrode 2.

The oxygen partial pressure controlling means 6 comprises a hydrogen source 7, incorporating a hydrogen purification system, connected with a hydrogen flow rate stabilizer 8; a carrier-gas source 9 (argon may be used as the carrier gas in the herein described embodiment of the invention) connected with an argon flow rate stabilizer 10, which, in its turn, is connected with a water vapor source 11 of adjustable flow rate. Connected with a source 11 of water vapor is a registering instrument 12 which is adapted to measure and put on record the oxygen activity in the gas mixture supplied to the reference electrode 2 positioned inside the cavity of electrolyte 3. Electrolyte 3 is shaped to provide access of the gas mixtures to reference electrode 2. Additionally, a converter 13 is connected with the water vapor source 11, which converter is, in its turn, connected with the E.M.F. measuring device 5. This converter 13 adjusts the flow rate of the water vapor source 11, when the E.M.F. of the concentration cell deviates from zero.

The thermocouple 4 is electrically connected to a temperature measuring and recording instrument 14, whereby the temperature of the metal 1 being tested is continuously recorded.

In the herein described preferred embodiment of the present invention a predetermined partial pressure of oxygen in the reference electrode 2 is maintained by means of the above described controller means 6, which latter supplies a gas mixture containing hydrogen and water vapor in a stream of carrier gas. In this embodiment, argon is used as the carrier gas. However, it is quite possible to use other gas mixtures capable of maintaining a predetermined partial pressure of oxygen at the reference electrode 2. It is also possible to make use of other units capable of controlling the partial pressure of oxygen at the reference electrode, such as vacuum pumps, metal oxide dissociation cells, and so on.

The herein disclosed apparatus, embodying the present invention, operates, as follows.

The gas mixture is supplied from the block 6 to the reference electrode 2. When the oxygen activity in the reference electrode 2 differs from that of the metal 1 being tested, there appears an electromotive force across the electrodes of the cell, the value of this E.M.F. being measured by the device 5. This measured value of the E.M.F. is fed to the converter 13. Depending on the actual polarity and magnitude of the E.M.F., the converter 13 controls the water vapor source 11, whereby the supply rate of the water vapor is adjusted, and, consequently, the gas mixture supplied to the electrode 2 is adjusted for the partial pressure of oxygen therein to be equal to that of the metal 1 being tested. The gas mixture is adjusted, until this equality of the activity of oxygen of the reference electrode 2 and the activity of oxygen in the metal 1 is achieved, which fact is heralded by the E.M.F. across the electrodes of the cell, which is brought about by the difference between the oxygen activities of the two electrodes dropping to zero.

As long as the E.M.F. is kept at a zero value, the supply rate of the water vapor, and, consequently, the composition of the gas mixture supplied to the reference electrodes 2 are maintained unchanged. It should be noted, that with the supply rate of hydrogen being constant (which is insured by the operation of the hydrogen flow rate stabilizer 8), the supply rate of the water vapor registered by instrument 12 is linearly related to the oxygen activity of the reference electrode 2.

The instrument 12 which measures and records the activity of oxygen in the gas mixture based upon the partial pressure of water vapor can be considered as one measuring and recording the oxygen activity of the electrode 2. Since the oxygen activity of the electrode 2 is equal to the oxygen activity of the metal 1 being tested when the E.M.F. across the two electrodes equals zero, the instrument 12 is thus engaged in measuring and recording the oxygen activity of the metal 1 being tested.

Thus, when the E.M.F. across the two electrodes is brought to zero, the measurement cycle of the herein disclosed apparatus is completed. It starts again when a difference appears between the oxygen activity of the two electrodes of the oxygen concentration cell.

The herein disclosed apparatus provides for measuring oxygen activity in liquid and solid metals and alloys, either intermittently or continuously. This activity, in its turn, can be re-calculated into the content of dissolved oxygen. Providing for setting up a system of continuous control of oxygen content or oxidation of a metal in the course of smelting or treatment thereof, the present invention enables a metallurgist to maintain an optimal oxygen duty of these processes, whereby the production rate of metallurgical equipment can be increased and the quality of metal can be improved due to the oxygen content's being being kept precisely at a desired level. Besides, the present invention also provides conditions for introducing automation into metallurgical processes.

What is claimed is:

1. A method for determining the activity of oxygen in a metal comprising using the metal as an electrode and pairing the same with a reference electrode across a solid electrolyte of an oxygen concentration cell, supplying water vapor and hydrogen to said reference electrode, measuring deviations of the E.M.F. between the electrodes, from a reference value, adjusting the partial pressure of oxygen in contact with the reference electrode to maintain the E.M.F. at said reference value by adjusting the supply rate of water vapor and determining the oxygen activity in said metal based upon the supply rate of water vapor.

2. A method as claimed in claim 1 wherein the reference value is zero.

3. A method as claimed in claim 1 further comprising measuring and recording the temperature of the reference electrode.

References Cited

UNITED STATES PATENTS

| | | | |
|---|---|---|---|
| 3,297,551 | 1/1967 | Alcock | 204—195 |
| 3,442,773 | 5/1969 | Wilson | 204—1 T |
| 3,481,855 | 12/1969 | Kolodney et al. | 204—195 |
| 3,514,377 | 5/1970 | Spacil et al. | 204—195 |

TA-HSUNG TUNG, Primary Examiner

U.S. Cl. X.R.

204—195 S